United States Patent [19]

Izumisawa

[11] Patent Number: 4,761,753
[45] Date of Patent: Aug. 2, 1988

[54] VECTOR PROCESSING APPARATUS

[75] Inventor: Hiroyuki Izumisawa, Tokyo, Japan

[73] Assignee: NEC Corporation, Tokyo, Japan

[21] Appl. No.: 654,889

[22] Filed: Sep. 27, 1984

[30] Foreign Application Priority Data

Sep. 28, 1983 [JP] Japan .................................. 58-179621

[51] Int. Cl.$^4$ .............................................. G06F 7/38
[52] U.S. Cl. ..................................... 364/736; 364/730
[58] Field of Search ........ 364/730, 736, 200 MS File,
364/900 MS File, 749

[56] References Cited

U.S. PATENT DOCUMENTS

| | | | |
|---|---|---|---|
| 4,128,880 | 4/1978 | Cray, Jr. .............................. | 364/200 |
| 4,302,818 | 11/1981 | Niemann .............................. | 364/736 |
| 4,435,765 | 3/1984 | Uchida et al. ........................ | 364/200 |
| 4,507,728 | 3/1985 | Sakamoto et al. ................... | 364/200 |
| 4,600,986 | 7/1986 | Scheuneman et al. .............. | 364/200 |
| 4,620,275 | 10/1986 | Wallach et al. ...................... | 364/200 |
| 4,661,900 | 4/1987 | Chen et al. ........................... | 364/200 |
| 4,685,076 | 8/1987 | Yoshida ................................ | 364/736 |

FOREIGN PATENT DOCUMENTS

| | | | |
|---|---|---|---|
| 0149555 | 9/1983 | Japan ................................... | 364/730 |
| 0149556 | 9/1983 | Japan ................................... | 364/730 |
| 0173876 | 10/1984 | Japan ................................... | 364/730 |
| 2113878 | 8/1983 | United Kingdom ................ | 364/730 |
| 2136172A | 9/1984 | United Kingdom ................ | 364/724 |

OTHER PUBLICATIONS

Kogge, Peter M., "The Architecture of Pipelined Computers", McGraw-Hill, 1981, pp. 1-6.

Primary Examiner—Gary V. Harkcom
Assistant Examiner—Long Thanh Nguyen
Attorney, Agent, or Firm—Foley & Lardner, Schwartz, Jeffery, Schwaab, Mack, Blumenthal & Evans

[57] ABSTRACT

A vector operation processing apparatus utilizes a plurality of vector registers in a pipeline computer architecture. The vector registers store ordered data elements which are processed in a pipelined vector operation unit in response to a vector instruction which designates selected ones of the vector registers. An input selection circuit is utilized for writing results of the operation performed by the pipelined vector operation unit into the vector registers which are designated by the vector instruction. A write control device is used for causing the writing operation to be performed exclusively on the plurality of vector registers in response to an indication by the vector instruction.

7 Claims, 3 Drawing Sheets

| 0 | A(3)*B(3) + A(4)*B(4) |
| 1 | A(7)*B(7) + A(8)*B(8) |

| 0 | A(5)*B(5)+A(6)*B(6)+A(7)*B(7)+A(8)*B(8) |

(1) ⇓

| 0 | $\sum_{I=1}^{8} A(I) * B(I)$ |

VECTOR PROCESSING APPARATUS

BACKGROUND OF THE INVENTION

The present invention relates to a vector processing apparatus for performing vector operations for scientific and technological computation.

In parallel with ever extending application of computers, the demand for high-speed data processing by computers is increasing. Today, ultrahigh-speed computers, or supercomputers, are under extensive development as an implementation which successfully meets such a demand. In a supercomputer, an enormous amount of data to be processed is considered to be a mass of vector data, i.e., ordered one-dimensional data (vector data), and they are processed at high speed by a vector processing apparatus operating based on a pipeline technique as described in the publication "The Architecture of Pipelined Computers", pp. 1-5, published in 1981 by McGraw-Hill Book Company. For the above-described type of vector processing apparatus, a reference can be made to the U.S. Pat. No. 4,128,880. The disclosed apparatus comprises a plurality of vector registers for individually holding an ordered set of data elements, an output selection circuit for delivering the successive data elements designated by a vector instruction in response to clock, a vector operation unit associated with the pipelined vector instruction for processing the data element, and an input selection circuit for writing the result of the data processing from the output of the vector operation unit into the vector register which is designated by the vector instruction.

Where such a prior art vector processing apparatus is used to compute, for example, an inner product which often appears in fluid equations and other scientific and technological computation, i.e., an operation wherein a successive result of multiplication is added to its preceding result of multiplication, intermediate results of operations are written into a common vector register. It follows consequently that in the case of addition of intermediate results, the operation is performed on a common vector register in contrast to the plurality of registers of the pipeline system, thereby lowering the processing rate.

In more detail, the U.S. Pat. No. 4,128,880 describes by way of example cumulative summation of a vector of sixty-four elements in FIG. 9 and col. 17, lines 1-39. The summation is such that elements stored in a vector register V1 are added element by element to an initial value "0", the result being stored in a vector register V2. The stored result of summation is fed again to the operation unit as an operand. In this proposed method, assuming that n clock pulses are required for a cycle which begins with reading a certain operand and ends with using it via the operation unit as the next operand, the number of results eventually obtained is (total number of elements)/n, summation at intervals of n. In this particular example, since n=8, the vector summation of sixty-four elements yields eight results of summation at the intervals of eight. In order that a cumulative result of sixty-four elements may be obtained on the basis of the eight intermediate results, (8-1) scalar operations are required in each of which a result of the operation is employed as an operand for the next operation. The problem with the scalar operations is that they consume a far longer period of time than vector operations.

SUMMARY OF THE INVENTION

It is, therefore, an object of the present invention to provide a vector processing device which solves the problem discussed above and enhances fast inner product operations.

According to one aspect of the invention, there is provided a vector operation processing apparatus which comprises: a plurality of vector registers for individually holding ordered data elements, a pipelined vector operation unit for processing data elements successively transmitted from the vector registers which are designated by a vector instruction, an input selection circuit for writing results of the operations performed by the pipelined vector operation unit in the vector registers which are designated by the vector instruction, and a write control circuit for causing the writing operation to be performed exclusively on the plurality of vector registers in response to an indication by the vector instruction.

BRIEF DESCRIPTION OF THE DRAWINGS

The above and other objects, features and advantages of the present invention will become apparent from the following detailed description taken with the accompanying drawings in which:

FIGS. 4A to 4D show an operational process in accordance with the invention.

In all the drawings, the same reference numerals denote the same structural elements.

DESCRIPTION OF THE PREFERRED EMBODIMENTS

Figure 1:
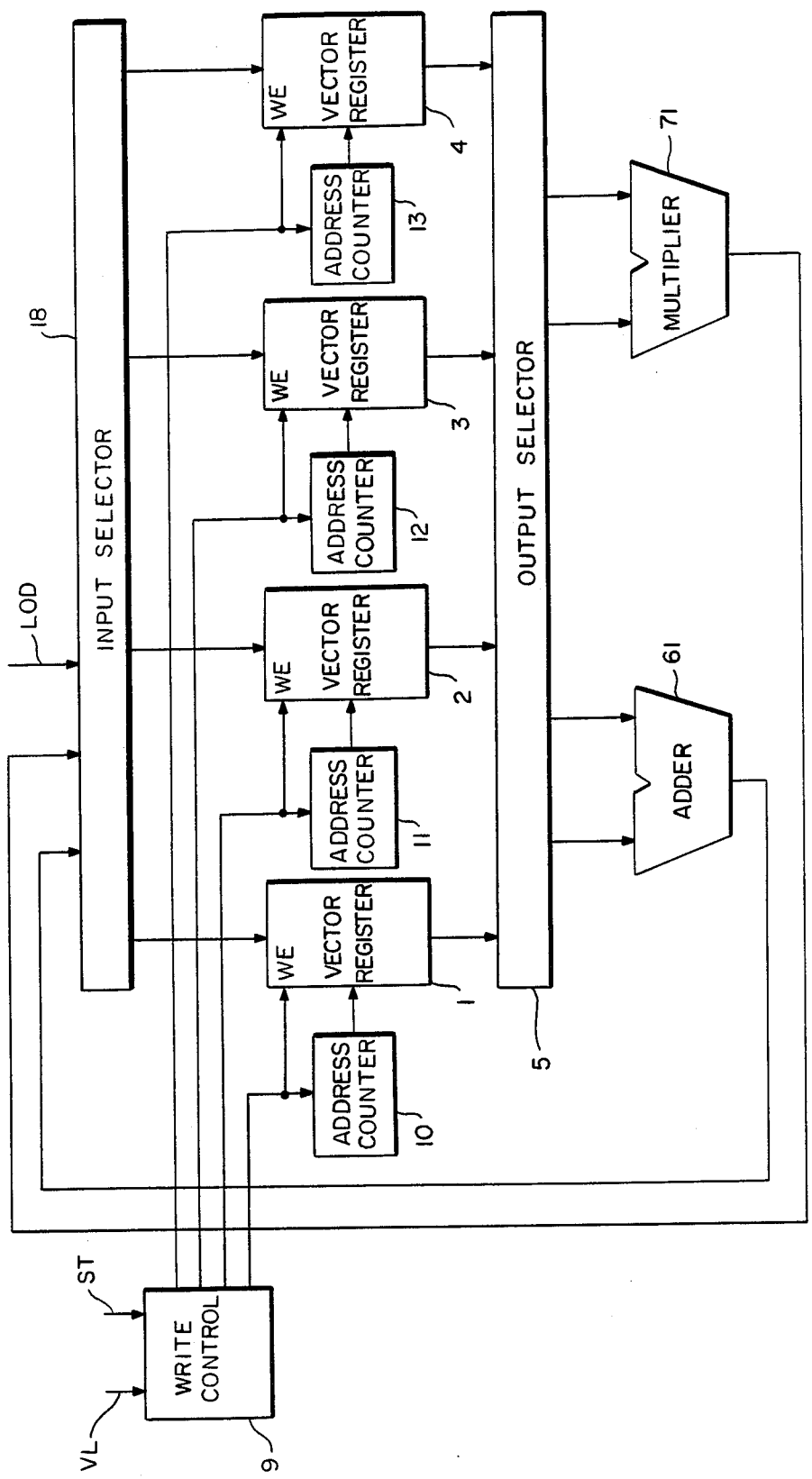
FIG. 1 shows an embodiment of the present invention.

Referring to FIG. 1, a vector processing apparatus embodying the invention comprises four vector registers 1, 2, 3 and 4, an output selection circuit 5, a pipelined adder 6, a multiplier 7, an input selector 8, a write control circuit 9, and four address counters 10, 11, 12 and 13.

Each of the vector registers 1 to 4 is capable of holding sixty-four data elements, while address counters 10, 11, 12 and 13 are associated respectively with the vector registers 1 to 4 in order to designate their addresses. Each of the address counters 10 to 13 is constructed to hold a value "0" at the start of a vector instruction and increment in response to every clock pulse.

In the case where the operation code of a vector instruction specifies loading, data elements LOD from a main memory (not shown) are sequentially written into one of the vector registers 1 to 4 which is selected by the input selector 8, in response to every clock pulse. The addresses of the vector registers 1 to 4 and main memory are designated respectively by first and second operand portions of the vector instruction. Also, specified by the vector instruction is the number of data elements to be loaded in at least one vector register.

Where the operation code of a vector instruction specifies addition, the output selector 5 selects two of the vector registers 1 to 4 designated respectively by second and third operand portions of the vector instruction so as to sequentially apply data elements held thereby to the adder 6 in response to every clock pulse.

The pipelined adder 6 sequentially sums the data elements output from the output selector 5, the summation results being routed to the selector 8. The input selector 8 in turn sequentially writes the summation results into one of vector registers 1 to 4 designated by the first operand portion, in response to every clock pulse.

The procedure described above similarly applies to a case wherein the operation code of a vector instruction specifies multiplication, except that the multiplier 7 functions in place of the pipelined adder 6 which is adapted for addition.

Now, where the operation code of a vector instruction specifies computation of an inner product, the write control circuit 9 is activated. An example of inner product computation is indicated by the following program:

$$DO\ 10\ I = 1,\ VL$$
$$S = S + A(I) * B(I)$$
$$10\ CONTINUE$$

Figure 2:
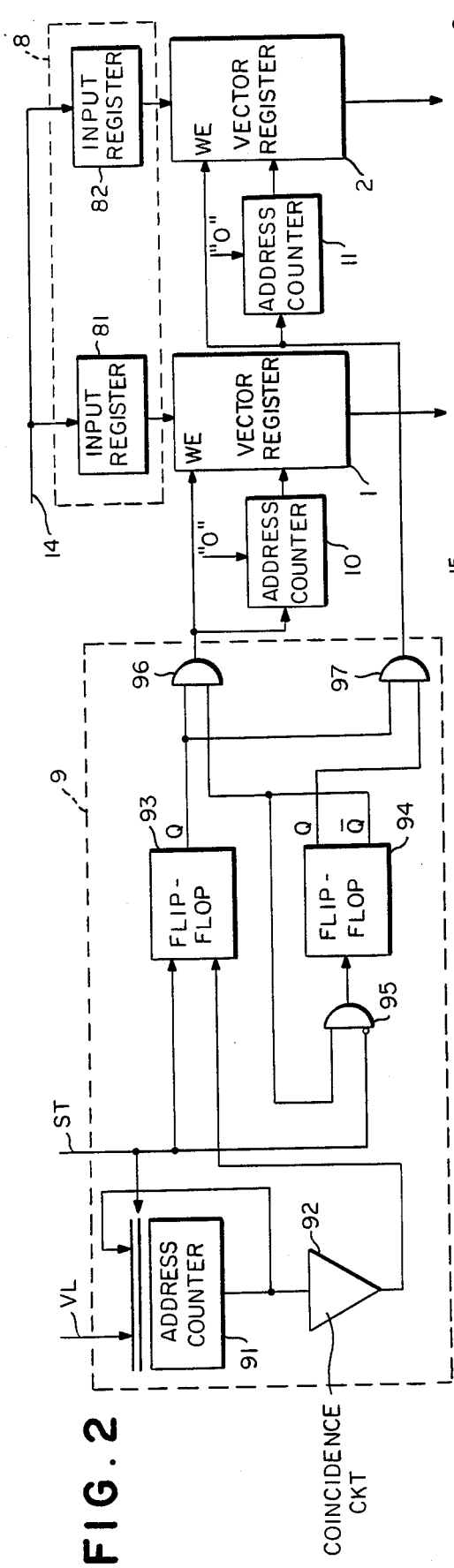
FIG. 2 is a diagram of an exemplary detailed construction of a part of the apparatus of FIG. 1.

Referring to FIG. 2, a detailed construction of the write control circuit 9 is shown together with the vector registers 1 and 2, address counters 10 and 11, and input registers 81 and 82 which constitute a part of the input selector 8 of FIG. 1. It should be noted in FIG. 2 that the registers 1 and 2 and the counters 10 and 11 are only illustrative and represent any two of the registers 1 to 4 and any two of the counters 10 to 13 shown in FIG. 1; the two vector registers and the two address counters to be selected are designated by a vector instruction.

In FIG. 2, the write control 9 comprises an address counter 91, a coincidence circuit 92, an RS-type flip-flop (F/F) 93, a D-type F/F 94, and three AND gates 95, 96 and 97.

When a result of the operation provided by the multiplier 7 or the adder 6 is to be written into the vector register in response to a vector instruction which specifies an inner product operation, a vector length VL and a start signal ST are first applied from a control section (not shown) of the vector processing apparatus to the circuit 9. The start signal ST is a pulse having a narrow duration and is deactivated after one clock. In response to the signal ST, the F/F 93 is set and the address counter 91 accepts the vector length VL. The set condition of the F/F 93 continues until logical "0" has been applied from the coincidence circuit 92 to a reset input terminal of the F/F 93.

The F/F 94 is initially held in its reset condition so that an AND condition is satisfied at the AND gate 96. Then the AND gate 96 delivers logical "1" to a write enable terminal WE of the vector register 1. Meanwhile, it is seen that the output of the AND gate 97 is logical "0". As a result, the data elements (operation results) input to both the input registers 81 and 82 are allowed to be written exclusively into the vector register 1. Since the address counter 10 is initially loaded with address "0", a first one of the data elements 14 (number 0) is written into address 0 of the vector register 1 in response to the first clock. The address counter 10 is incremented in response to logical "1" output from the AND gate 96.

In this condition, the AND gate 95 is delivering a logical "1" so that the F/F 94 becomes set by the second clock. This causes the AND gate 96 to develop logical "0" and the AND gate 97 logical "1" and, thereby, allows the second one of the data elements (number 1) to be written into address 0 of the vector register 2. The address counter 11 is incremented in response to logical "1" output from the gate 97.

In response to the third clock, the F/F 94 becomes reset causing the third one of the data elements to be written again into the address 1 of the register 1. In this manner, odd ones of the data elements are written into the register 1 and even ones in the register 2 in an alternating fashion.

Meanwhile, the address counter 91 is decremented by 1 (one) after the application of the second clock pulse, which deactivates the start signal ST, in response to a clock pulse. The content held by the address counter 91 is also applied to the coincidence circuit 92 to be compared thereby with 1. As soon as the content of the counter 91 equals 1, the circuit 92 applies logical "1" to the reset input terminal of the F/F 93 so as to reset it. As a result, the outputs of both the gates 96 and 97 become logical "0" so that the data elements are not written any more into the register 1 or 2. In the manner described, the data elements, the number of which is identical with the vector length VL, are exclusively written into the vector registers 1 and 2.

Where the vector length VL is 8 in the inner product operation represented by the previously shown program (initial value of S is assumed to be 0), the program is executed in four different subprograms.

Referring to FIG. 4A, the first subprogram starts with sequentially applying two sets of data elements A(1)–A(8) and B(1)–B(8) respectively held by, for example, the vector registers 1 and 2 to the multiplier 7 via the output selector 5 as operands. The multiplier 7 performs multiplication on the two operands to produce eight results of multiplication A(1)*B(1) to A(8)*B(8). These eight results are exclusively written into addresses 0 to 3 of, for example, the vector registers 3 and 4. Specifically, the results of multiplication A(1)*B(1), A(3)*B(3), A(5)*B(5) and A(7)*B(7) are respectively written into addresses 0, 1, 2 and 3 of the vector register 3, while the results A(2)*B(2), A(4)*B(4), A(6)*B(6) and A(8)*B(8) are respectively written into addresses 0, 1, 2 and 3 of the register 4. The address counter 91 has been initialized to hold the vector length VL=8 by the first subprogram.

Next, in the second subprogram shown in FIG. 4B, the four results of multiplication A(1)*B(1), A(3)*B(3), A(5)*B(5) and A(7)*B(7) stored in the vector register 3 and those A(2)*B(2), A(4)*B(4), A(6)*B(6) and A(8)*B(8) stored in the vector register 4 are sequentially applied to the adder 6, which then performs four additions by the pipeline system. The results of the addition A(1)*B(1)+A(2)*B(2) and A(5)*B(5)+A(6)*B(6) are written, respectively, into addresses 0 and 1 of the register 1, while the results A(3)*B(3)+A(4)*B(4) and A(7)*B(7)+A(8)*B(8) are written into addresses 0 and 1 of the register 2. The address counter 91 has been initialized by the second subprogram to the vector length VL=4.

In the third subprogram which is shown in FIG. 4C, the previously described results of addition stored by twos in the registers 1 and 2 are summed in the same manner by the pipeline system. After the address counter 91 has been initialized to a vector length VL=2, the result A(1)*B(1)+A(2)*B(2)+A(3)*B(3)+A(4)*B(4) is written into address 0 of the register 3 and the result A(5)*B(5)+A(6)*B(6)+A(7)*B(7)+A(8)*B(8) in address 0 of the register 4.

Further, in the fourth subprogram shown in FIG. 4D, the content held in the address 0 of the vector register 3 and that held in the address 0 of the vector register 4 are summed in the manner described, so that the final result $$\sum_{I=1}^{8} A(I) * B(I)$$

is written into the address 0 of, for example, the vector register 1. The address counter 91 at this instant has been initialized to 1.

The equation S=S+A(I)*B(I) in the above description does not limit the present invention. If desired, the equation may be such that the operands A(I) and B(I) are summed or such that the result of operation on the operands A(I) and B(I) is multiplied, subtracted or divided by S.

In the illustrative embodiment, the intermediate results of the operation are alternately distributed to the registers 1 and 2. This is merely for illustrative purpose, however. That is, the purpose of the present invention resides in exclusively writing the intermediate results in a plurality of vector registers. For example, the write control circuit 9 shown in FIG. 1 may be constructed as shown in detail in FIG. 3 in order to write the former half of the intermediate results into addresses 0 to (VL/2−1) of the vector register 1 and the latter half into the same addresses of the vector register 2.

Figure 3:
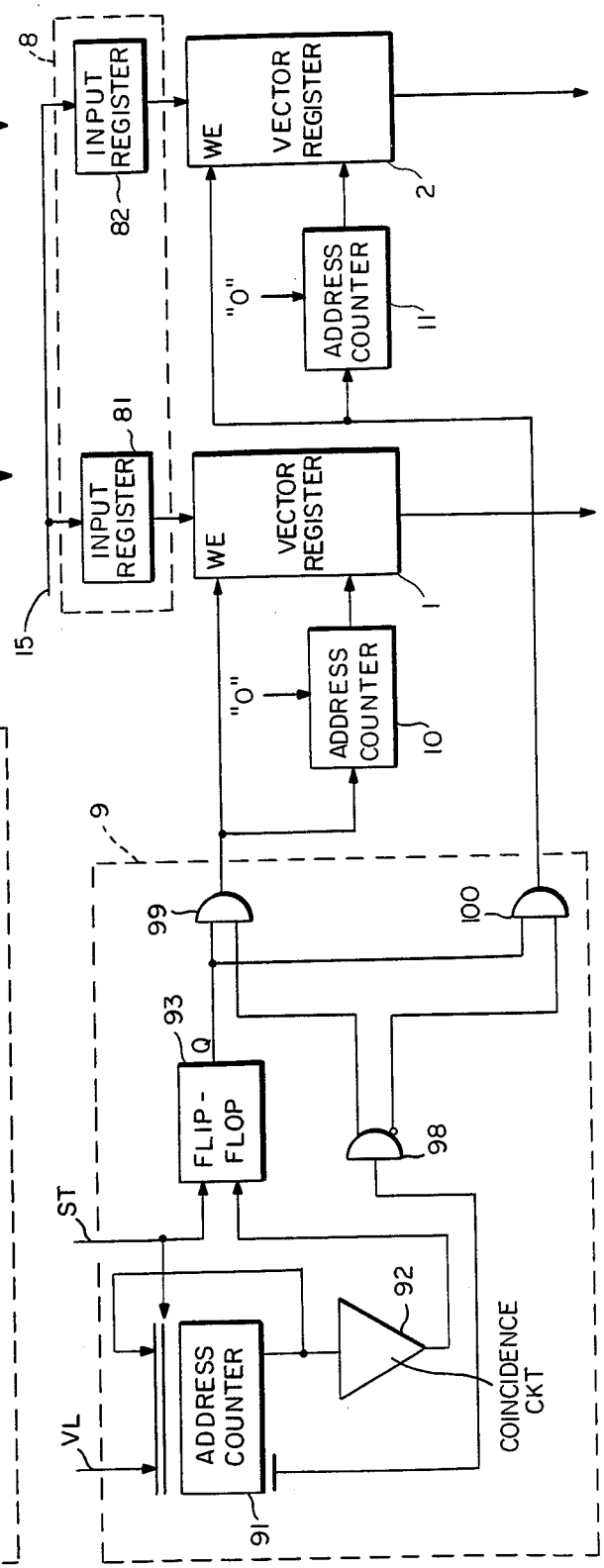
FIG. 3 is a diagram of a modification to the circuitry shown in FIG. 2.

In the modification shown in FIG. 3, the most significant bit of a content held by the address counter 91 is used for switching the vector registers 1 and 2. Address counters 10, 11 and 91, coincidence circuit 92, an F/F 93, AND gates 99 and 100, and input registers 81 and 82 shown in FIG. 3 are respectively the matches counterparts of the address counters 10, 11 and 91, coincidence circuit 92, F/F 93, AND gates 96 and 97, vector registers 1 and 2, and input registers 81 and 82 shown in FIG. 2. Also, an AND gate 98 has the same common function as the AND gate 99 and F/F 94.

In any of the embodiments shown and described, the vector registers and the operation units may be permanently interconnected with a view to eliminating the output selection circuit.

In summary, it will be seen that the present invention provides a vector processing apparatus which is capable of adopting the pipeline system even for inner product computation in which intermediate results of operation are used as operands.

What is claimed is:

1. A vector operation processing apparatus comprising:
   a plurality of vector registers for individually holding ordered data elements;
   a pipelined vector operation unit for processing said ordered data elements successively transmitted from a first pair of said vector registers which are designated by a vector instruction to produce intermediate operands;
   an input selection circuit for writing said intermediate operands into a second pair of said vector registers which are designated by said vector instruction; and
   a write control means which is responsive to a vector instruction which specifies an inner product operation for causing said writing operation to be performed alternately between said first and second pairs of vector registers.

2. A vector operation processing apparatus as recited in claim 1, wherein said vector operation unit comprises at least one of a vector adder and a vector multiplier.

3. A vector operation processing apparatus as recited in claim 1, wherein said vector operation unit comprises a vector adder and a vector multiplier and wherein said apparatus performs an inner product of an equation in the form of $$S=\Sigma A(j)*B(j),$$

where J=1 to I in response to said vector instruction which specifies an inner product operation and said write control means causes intermediate results of multiplication and addition to be alternately stored between said designated first and second pairs of vector registers and wherein I is equal to the length of vectors A and B.

4. A vector operation processing apparatus as recited in claim 1, wherein said write control means comprises means for storing a vector length indication indicative of the number of times said write operation is performed exclusively and alternately on said first and second pairs of designated vector registers.

5. A vector operation processing apparatus as recited in claim 1, wherein said write control means includes at least one flip-flop and means for alternately setting and resetting said flip-flop to control write enable inputs of said designated registers.

6. A method of processing data in a vector processing system comprising the steps of:
   (a) storing ordered data elements as operands in a plurality of vector registers;
   (b) in response to a vector instruction which specifies an inner product operation, successively transmitting said operands from a first pair of said plurality of vector registers to a vector processing unit in accordance with said vector instruction;
   (c) processing said operands in said vector processing unit in accordance with said vector instruction to produce intermediate results;
   (d) writing said intermediate results of said inner product operation produced in said processing step (c) exclusively and alternately in a designated second pair of said plurality of vector registers in accordance with said vector instruction;
   (e) successively transmitting said intermediate results from said second pair of said plurality of vector registers to said vector processing unit in accordance with said vector instructions;
   (f) processing said intermediate results in said vector processing unit in accordance with said vector instruction to produce additional intermediate results;
   (g) writing said additional intermediate results of said inner product operation produced in said processing step (f) exclusively and alternately into said first pair of said plurality of vector registers in accordance with said vector instruction; and
   (h) repeating steps (b)–(g) for said additional intermediate results as operands in accordance with said vector instructions.

7. A vector operation processing apparatus comprising:
   a first pair of vector registers for individually holding ordered data elements;

a pipelined vector operation unit for processing said ordered data elements successively transmitted from said first pair of vector registers, said first pair of vector registers designated by a vector instruction, to produce intermediate operands;

a second pair of vector registers;

an input selection circuit for writing said intermediate operands into said second pair of vector registers, said second pair of vector registers designated by said vector instruction;

a write control means responsive to a vector instruction which specifies an inner product operation for causing said writing operation to be performed exclusively and alternately on said designated second pair of vector registers;

said vector operation unit further operative on said intermediate operands in said second pair of vector registers in response to said vector instruction for processing said intermediate operands to produce additional intermediate operands;

said write control means being further responsive to said vector instruction which specifies said inner product operation to cause said additional intermediate operands from said vector operation unit to be written exclusively and alternately into said first pair of vector registers, such that intermediate results of an inner product operation are automatically written into said first and second pairs of vector registers.

* * * * *